Jan. 17, 1939.  J. B. MARS  2,143,893
EGG OPENING IMPLEMENT
Filed May 7, 1936
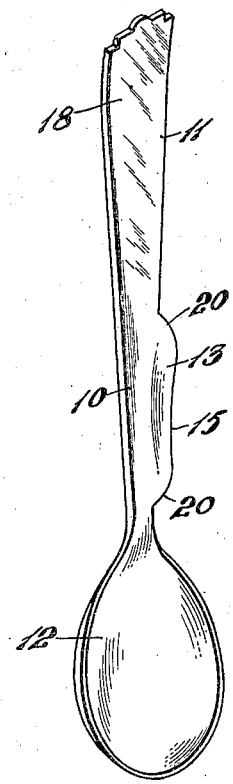
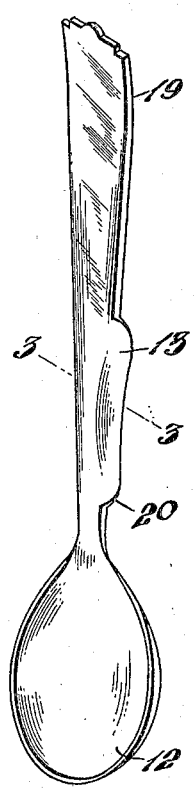
INVENTOR.
Jesse B. Mars
BY Barlow & Barlow
ATTORNEYS.

Patented Jan. 17, 1939

2,143,893

UNITED STATES PATENT OFFICE 2,143,893

EGG OPENING IMPLEMENT

Jesse B. Mars, Providence, R. I.

Application May 7, 1936, Serial No. 78,400

1 Claim. (Cl. 146—2)

This invention relates to culinary articles, and more particularly to a kitchen or table implement for use in removing the contents of boiled eggs; and has for an object to provide an implement adapted to be held in the hand and having cutting means for breaking open the shell of a boiled egg without injury to the yolk and for removing the contents therefrom.

Another object of the invention is to provide an implement of this character in which the egg opening means will be provided with an operating edge which will not only be serviceable to effect a satisfactory entry into the egg but will also be of such a character as to be free from sharp curves or projections which would render the implement dangerous to eat with.

A further object of the invention is to provide a balanced implement for such purposes, the eggshell breaking means of which is arranged on the shank of the implement so as to keep it in a balanced condition while lifting and to permit the content-removing portion to be used without turning or being overbalanced while being held in the hand during eating.

With these and other objects in view, the invention consists of certain novel features of construction, as will be more fully described, and particularly pointed out in the appended claim.

In the accompanying drawing:

Fig. 1 is a perspective front elevational view of an egg opening implement embodying my invention;

Fig. 2 is a perspective front elevational view of the implement shown in Fig. 1 and viewed from the opposite side; and Fig. 3 is a cross-sectional view taken on the line 3—3 of Fig. 2.

The present invention is intended as a distinct improvement over such prior constructions as shown in my Patent No. 1,316,315, dated September 16, 1919. In such prior structures the eggshell breaking or opening member comprises a blade having a cutting edge which extends lengthwise along and projects outwardly from one side of the shank body at the central portion of the implement. The blade is shown as being provided with an operating edge which conforms substantially in contour to the cross-sectional contour of an egg, and said edge is further formed with shoulders which limit its penetration into the egg. Also, the bowl of the content-removing member is shown as being off-center so that there is a turning effect in lifting the implement. Furthermore, this construction of the operating edge of the egg breaking portion of the implement presents sharp, curved end points which are unguarded and extremely dangerous, and no provision is made for protecting the user from injury thereby during eating. In order to overcome such objectionable features, I have provided the cutting member of the implement with an operating edge which is of relatively straight contour, and said edge may be slightly indented or curved as represented in Figs. 1 and 2, however, the curvature of which is negligible as compared with that of the construction in the patent above referred to; and I have further provided the cutting edge with inwardly curved end extremities which integrally join with and merge into the shank portion of the implement; and the following is a more detailed description of the present embodiment of this invention, illustrating the preferred means by which these advantageous results may be accomplished:

With reference to the drawing, 10 designates the shank portion of my improved combined egg opening and content-removing implement having an upper handle portion 11 rigid therewith, while at the opposite end of the shank is integrally formed a spoon 12. The implement may be made of any suitable material, such as pressed metal or molded materials. The handle portion 11 consists of a more or less flattened body the side edges of which taper inwardly toward the longitudinal axis of the implement and merge into the shank portion 10. The spoon member 12 may be of any suitable shape, but preferably it is formed symmetrical with respect to the longitudinal axis of the implement. Formed integral with the shank 10 and centrally disposed between the spoon 12 and the handle 11 of the implement is the eggshell breaking member 13 having a cutting edge 15 which extends longitudinally along the shank body 10 and is of generally straight form, although it may partake of a very slight curvature, if desired. As illustrated in Fig. 3, the cutting member 13 is provided with oppositely disposed convex side faces 16 and 17 which converge to form the cutting edge 15. The upper front and back face portions 18 and 19 of the handle 11 may be bent or curved forwardly a slight amount in order to add to the appearance and motif of the implement. The end extremities of the member 13 are suitably rounded in the direction of the shank as at 20 in order to provide a generally curved contour for the purpose of eliminating sharp corners at the end portions of the egg breaking member 13, and thereby affording a cutting member which will be free from exposed and dangerous projections capable of injuring the user.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

An implement for opening eggs at a dining table comprising an elongated body having a tapered shank portion extending lengthwise therealong, the wider portion of the shank forming a handle at one end and terminating at the other end with an enlarged curved bowl portion which is substantially symmetrical with the longitudinal axis of said body, and an eggshell opening member formed integrally with said shank portion and projecting from a side edge of the same, said opening member having an elongated substantially straight cutting edge extending lengthwise of the shank and disposed at less distance from the adjacent side thereof than is the widest portion of the shank and rounded at its opposite ends, the top and bottom side faces of said opening member sloping to the outer edge to form a blade body of convex wedge-shaped cross-section.

JESSE B. MARS.